US012248842B2

(12) United States Patent
Cohen et al.

(10) Patent No.: US 12,248,842 B2
(45) Date of Patent: Mar. 11, 2025

(54) RING SCANNER WITH COUNTING FUNCTION AND METHOD THEREOF

(71) Applicant: RGIS INTERNATIONAL HOLDINGS, LLC, Auburn Hills, MI (US)

(72) Inventors: Asaf Cohen, Ramat Gan (IL); Sudipto Nandy, Charlotte, NC (US); Ruth Percik, Ramat Gan (IL); David Kagan, Tel Aviv (IL); Patrick Marcel Gilbert André Chossat, Chatillon (FR); Mathieu Jean-Marie Durieux, Helecine (BE); Nicola Jane Stevens, Derby (GB); John Frazer Cundall, Sheffield (GB); Jerome Thur, Les Pinthieres (FR)

(73) Assignee: RGIS INTERNATIONAL HOLDINGS, LLC, Auburn Hills, MI (US)

( * ) Notice: Subject to any disclaimer, the term of this patent is extended or adjusted under 35 U.S.C. 154(b) by 0 days.

(21) Appl. No.: 18/064,175

(22) Filed: Dec. 9, 2022

(65) Prior Publication Data

US 2024/0193386 A1 Jun. 13, 2024

(51) Int. Cl.
*G06K 7/10* (2006.01)
*G06F 3/01* (2006.01)
*G06F 3/16* (2006.01)

(52) U.S. Cl.
CPC ......... *G06K 7/10891* (2013.01); *G06F 3/016* (2013.01); *G06F 3/16* (2013.01); *G06K 7/10861* (2013.01); *G06K 2007/10534* (2013.01)

(58) Field of Classification Search
CPC ..... G06K 7/10891; G06K 2007/10534; G06K 7/10396; G06K 2007/10524; G06F 3/016; G06F 3/014; G06F 1/163
See application file for complete search history.

(56) References Cited

U.S. PATENT DOCUMENTS

| | | | | |
|---|---|---|---|---|
| 3,742,488 A | * | 6/1973 | Von Voros | G01D 5/347 341/13 |
| 3,991,299 A | * | 11/1976 | Chadima, Jr. | G06K 7/10881 235/462.49 |
| 4,903,565 A | * | 2/1990 | Abe | G10H 1/0041 84/DIG. 12 |
| 4,935,610 A | * | 6/1990 | Wike, Jr. | G06K 7/10891 235/462.35 |
| 5,023,438 A | * | 6/1991 | Wakatsuki | G07G 1/00 345/169 |
| 5,142,131 A | * | 8/1992 | Collins, Jr. | G06K 7/10891 235/462.46 |

(Continued)

OTHER PUBLICATIONS

International Search Report directed to related International Application No. PCT/US2023/082121, issued Mar. 13, 2024; 9 pages.

*Primary Examiner* — Daniel I Walsh
(74) *Attorney, Agent, or Firm* — Sterne, Kessler, Goldstein & Fox, P.L.L.C.

(57) ABSTRACT

A scanner device has count buttons. A user can count the number of inventory by pressing the count buttons. Each of the count buttons is assigned a corresponding inventory count. The user can perform a quick and accurate count by pressing count buttons depending on the number of items recognized.

20 Claims, 9 Drawing Sheets

(56) References Cited

U.S. PATENT DOCUMENTS

| | | | | |
|---|---|---|---|---|
| 5,191,197 A * | 3/1993 | Metlitsky | G06Q 20/343 | 235/462.44 |
| 5,272,324 A * | 12/1993 | Blevins | G06K 17/0022 | 235/462.15 |
| 5,340,972 A * | 8/1994 | Sandor | G06K 7/10653 | 250/221 |
| 5,371,348 A * | 12/1994 | Kumar | G06K 7/10881 | 235/462.47 |
| 5,404,001 A * | 4/1995 | Bard | G06K 7/10653 | 250/227.26 |
| 5,410,140 A * | 4/1995 | Bard | G06K 7/10881 | 235/462.44 |
| 5,543,610 A * | 8/1996 | Bard | G06K 7/10564 | 235/462.46 |
| 5,655,910 A * | 8/1997 | Troudet | G09B 19/00 | 434/233 |
| 5,675,138 A * | 10/1997 | La | G06K 7/10891 | 235/462.44 |
| 5,742,043 A * | 4/1998 | Knowles | G06K 7/10871 | 235/462.44 |
| 5,808,285 A * | 9/1998 | Rockstein | G06K 7/10702 | 235/462.01 |
| 5,808,289 A * | 9/1998 | Becker | G06K 7/10891 | 235/472.01 |
| 5,917,174 A * | 6/1999 | Moore | G06K 7/10891 | 235/462.44 |
| 6,098,877 A * | 8/2000 | Barkan | G06K 7/10891 | 235/25 |
| 6,202,930 B1 * | 3/2001 | Plesko | G06K 7/10633 | 235/462.43 |
| 6,412,700 B1 * | 7/2002 | Blake | G02B 26/106 | 235/472.01 |
| 6,607,134 B1 * | 8/2003 | Bard | G06F 1/163 | 235/462.46 |
| 6,616,046 B1 * | 9/2003 | Barkan | G06K 7/10643 | 235/462.25 |
| 7,140,546 B1 * | 11/2006 | Terlizzi | G06K 7/1098 | 235/472.01 |
| 7,453,442 B1 | 11/2008 | Poynter | | |
| 10,204,251 B1 * | 2/2019 | Fenty, III | G06Q 30/0621 | |
| 10,839,182 B2 * | 11/2020 | Sugiura | G06K 7/0017 | |
| D903,662 S * | 12/2020 | Zhu | D14/344 | |
| 10,970,507 B1 * | 4/2021 | Cornell | G06K 7/10821 | |
| D947,178 S * | 3/2022 | Chae | D14/344 | |
| 11,288,474 B1 * | 3/2022 | Broderick | G06K 7/10891 | |
| D951,257 S * | 5/2022 | Chae | D14/427 | |
| 11,461,564 B2 * | 10/2022 | Niu | G06K 7/10891 | |
| 11,470,895 B2 * | 10/2022 | Guenther | G07C 1/00 | |
| 2002/0092913 A1 * | 7/2002 | Bard | G06K 7/10584 | 235/472.02 |
| 2002/0195497 A1 * | 12/2002 | Kumagai | G06K 7/10851 | 235/472.01 |
| 2003/0233165 A1 * | 12/2003 | Hein | G06Q 10/087 | 700/215 |
| 2006/0108425 A1 * | 5/2006 | Wiklof | G06K 7/10891 | 235/462.44 |
| 2006/0192762 A1 * | 8/2006 | Corrion | G06F 3/0317 | 345/166 |
| 2008/0134318 A1 * | 6/2008 | Yoshimoto | G06F 21/31 | 726/19 |
| 2009/0064026 A1 * | 3/2009 | Walker | G05B 19/058 | 710/1 |
| 2009/0247299 A1 * | 10/2009 | Conticello | G06F 3/014 | 463/37 |
| 2009/0272811 A1 * | 11/2009 | An | G06K 7/10891 | 235/462.43 |
| 2011/0042461 A1 * | 2/2011 | Chen | G06K 7/10881 | 235/462.01 |
| 2011/0042463 A1 * | 2/2011 | Chen | G06K 7/10881 | 235/462.43 |
| 2014/0093344 A1 * | 4/2014 | Burton | A61J 7/02 | 414/675 |
| 2014/0326788 A1 * | 11/2014 | Henry | G06F 3/0213 | 235/462.46 |
| 2015/0278570 A1 * | 10/2015 | Van Horn | H01Q 1/52 | 235/472.01 |
| 2016/0042241 A1 * | 2/2016 | Todeschini | G06V 30/142 | 345/179 |
| 2016/0070439 A1 * | 3/2016 | Bostick | G06F 3/0304 | 715/728 |
| 2016/0180133 A1 * | 6/2016 | Oberpriller | G06K 7/10891 | 235/462.44 |
| 2017/0262678 A1 * | 9/2017 | Lin | G06K 7/10891 | |
| 2018/0167549 A1 * | 6/2018 | Lim | G06F 1/163 | |
| 2018/0189534 A1 * | 7/2018 | AlNasser | G06F 21/31 | |
| 2018/0225489 A1 * | 8/2018 | Liou | G06K 7/10544 | |
| 2018/0343024 A1 * | 11/2018 | Sahebjavaher | H04M 1/0202 | |
| 2019/0122012 A1 * | 4/2019 | Lei | G06K 7/1092 | |
| 2019/0172161 A1 * | 6/2019 | Conboy | B27N 9/00 | |
| 2019/0188433 A1 * | 6/2019 | Todescato | G06K 7/1091 | |
| 2019/0197273 A1 * | 6/2019 | Mazzone | G06K 7/10396 | |
| 2019/0304598 A1 * | 10/2019 | Hansen | A61B 42/10 | |
| 2020/0022433 A1 * | 1/2020 | Lu | G06K 7/10603 | |
| 2020/0134275 A1 * | 4/2020 | Sakamoto | G06K 7/10396 | |
| 2020/0150714 A1 * | 5/2020 | Sakamoto | G06F 3/014 | |
| 2020/0160016 A1 * | 5/2020 | Sakamoto | G06K 7/1404 | |
| 2020/0237032 A1 * | 7/2020 | Berlips | A41D 19/0027 | |
| 2020/0349786 A1 * | 11/2020 | Ho | G06V 40/172 | |
| 2020/0402049 A1 * | 12/2020 | Pi Farias | G06Q 20/208 | |
| 2020/0410446 A1 * | 12/2020 | Rahilly | G06F 21/35 | |
| 2021/0073609 A1 * | 3/2021 | Mohanty | G06M 3/08 | |
| 2021/0081166 A1 * | 3/2021 | Acciarri | G06F 3/0346 | |
| 2021/0110126 A1 * | 4/2021 | Miller | G06K 7/10891 | |
| 2021/0157995 A1 * | 5/2021 | Chang | G06K 7/1091 | |
| 2021/0232784 A1 * | 7/2021 | Torzilli | G06K 7/10722 | |
| 2021/0240263 A1 * | 8/2021 | Suzuki | G06F 3/014 | |
| 2022/0083137 A1 * | 3/2022 | Fountain | G06F 3/0416 | |
| 2022/0232957 A1 * | 7/2022 | Dunbar | G06K 7/1417 | |
| 2022/0261094 A1 * | 8/2022 | Cole | G06F 3/0202 | |
| 2022/0325999 A1 * | 10/2022 | Koumaras | G01B 3/004 | |
| 2022/0383013 A1 * | 12/2022 | Broderick | G06K 7/10891 | |
| 2023/0073313 A1 * | 3/2023 | Davis | G09B 19/0076 | |
| 2023/0112442 A1 * | 4/2023 | Kettner | G06K 7/1417 | 2/160 |
| 2023/0267290 A1 * | 8/2023 | Vargas | G06K 7/10881 | 235/472.01 |
| 2024/0152712 A1 * | 5/2024 | Broderick | G06K 7/10396 | |
| 2024/0152713 A1 * | 5/2024 | Broderick | G06K 7/1413 | |
| 2024/0249093 A1 * | 7/2024 | Puddu | G06K 7/10881 | |

* cited by examiner

RING SCANNER WITH COUNTING FUNCTION AND METHOD THEREOF

BACKGROUND

Field

This field is generally related to scanning devices.

Related Art

Inventory management has become increasingly important in recent years. An essential part of inventory management is accurately counting the number of items in a physical inventory and a retail warehouse.

Inventory workers (users) often use scanners to count the number of items. Scanners read bar codes, two-dimensional bar codes, or other identifiers (hereafter called codes) printed on products or packages containing multiple products. Inventory control systems account for the number of items according to what the scanner reads.

Users commonly hold the scanner in their hands, but in recent years, users have also been using ring scanners attached to their fingers. Ring scanners are more comfortable to operate because optical elements that perform the scanning are close to the user's finger. The ring scanner allows the user to scan more accurately.

Users sometimes use a terminal device in conjunction with a ring scanner that is separate from the ring scanner. Users often use the terminal device to display and process information collected from the ring scanner. The processing performed by the terminal device includes displaying product information and communicating with inventory management systems.

BRIEF SUMMARY

This disclosure provides a scanner device that can more accurately count items. Preferably, the scanner device has a housing, a count button located on the housing, an optical scanner located on the housing, and a controller. Preferably, the controller is configured to cause the optical scanner to scan a code of an item and send an instruction, when a user actuates the count button, indicating that the item has a count of a predetermined number.

BRIEF DESCRIPTION OF THE DRAWINGS/FIGURES

The present disclosure is described with reference to the accompanying drawings. In the drawings, reference numbers indicate identical or functionally similar elements. Additionally, the leftmost digit(s) of a reference number identifies the drawing in which the reference number first appears. In the accompanying drawings.

The present disclosure will now be described with reference to the accompanying drawings.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition does not in itself dictate a relationship between the various embodiments and/or configurations discussed.

The following description relates to a ring scanner as an example of a scanner device. After describing the structure of the scanner device, this disclosure describes an inventory management system that includes the scanner device, followed by a description of the operation of the scanner device and the terminal device.

Structure of the Scanner Device

FIGS. 1A-F are schematic diagrams illustrating a ring scanner according to an embodiment.

Figure 1A:
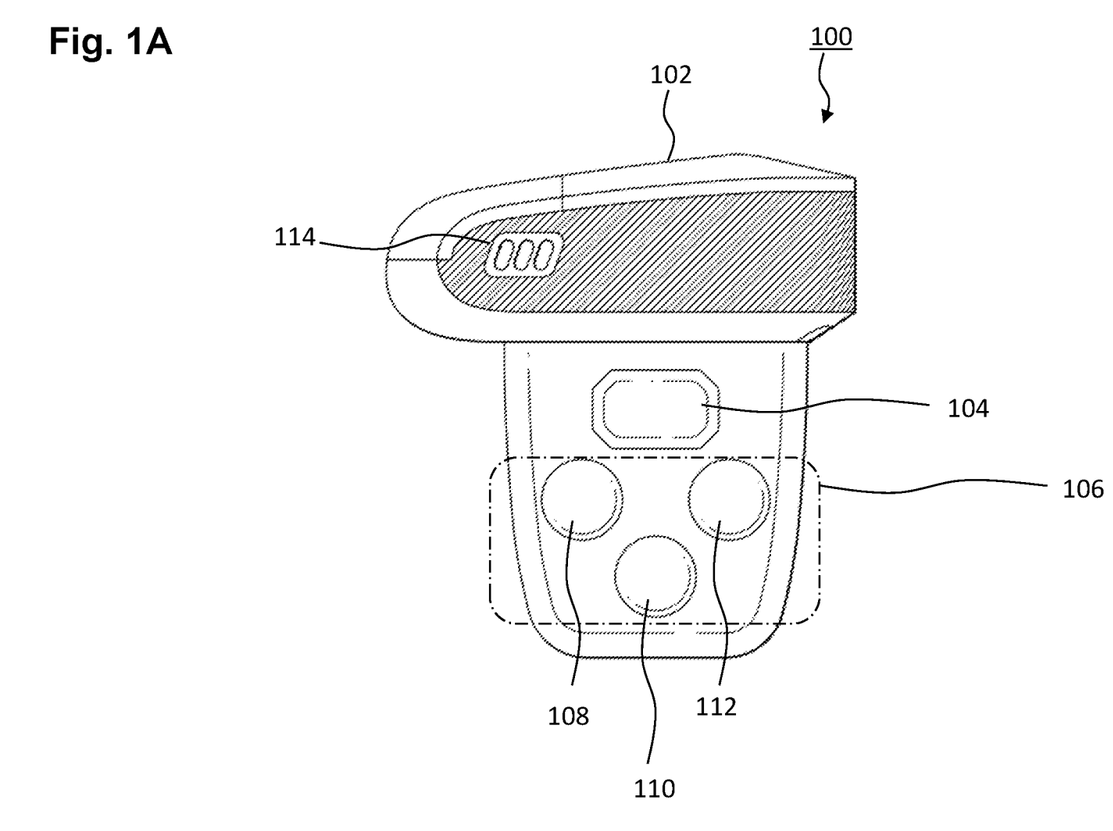
FIGS. 1A-F are schematic diagrams illustrating a ring scanner according to an embodiment.

FIG. 1A is a left-side view of scanner device 100. The user attaches the scanner device 100 to his or her finger. As an example, this disclosure describes a right-handed scanner device. When the user wears the scanner device 100, the user's fingertips are located on the left side of the FIG. 1A, and the user's wrist is located on the right side of FIG. 1A. The user primarily affixes the scanning device 100 to the user's right index finger. Note that this disclosure may explain that the user uses a particular finger to perform certain operations, but this is to facilitate understanding of this disclosure.

The housing 102 of the scanner device 100 holds or encloses the components described below. The housing 102 is primarily made of plastic material. The material of the housing 102 is not limited to plastic material and may be made of a variety of materials.

The scan button 104 is used to initiate scanning of the scanner device 100. The user actuates the scan button 104 primarily with the thumb.

The count buttons 106 is a button that specifies the number of items scanned by the scanner device 100. The user actuates the scan button 104 to scan the items and then actuates the count buttons 106 to specify the number of scanned items present. The user specifies the number of scanned items present by pressing the count buttons 106 after the user actuates the scan button 104. In this disclosure, the term "inventory count" may be used to refer to the number of items scanned, depending on the context.

When multiple identical products exist in a physical inventory or retail warehouse, it is time-consuming for the user to scan all the products. Therefore, the scanner device 100 of the present disclosure has a count buttons 106 that allows the user to enter the inventory count of the scanned items. For example, if a user scans one of the four items in stock, the user uses the count buttons 106 to enter four as the number of items in stock. In this way, the number of scans can be reduced, thus saving the user's time.

The scanner device 100 in the present disclosure has a count button 108, a count button 110, and a count button 112. Each count button has a different function. After the user has scanned, the user actuates count button 108 when the user enters "1" as the inventory count of the scanned item. Similarly, the user actuates the count button 110 when entering "2" as the inventory count of the scanned item. The user then actuates the count button 112 to enter "4" as the inventory count of the scanned item. The count buttons 106 are described in this disclosure as an example of a count button, the scanner device 100 may have a single count button.

The user can add up the number of inventory items entered with count buttons 106. For example, if the user scans one of the six items in inventory, the user can press a count button 110 and then press a count button 112. The order in which the count buttons are pressed is arbitrary.

The combination of count buttons 106 and the number of inventory counts described above is an example. The user may assign any number to any count buttons 106. For example, one or all of the count buttons 106 may be assigned any number from 1 to 12 as the inventory number. As another example, one or all of the count buttons 106 may be configured to be assigned one of 4, 6, or 12 as the inventory number.

As one preferred example of this disclosure, at least one count button can be a button to enter 4 as the inventory count. Having a count button to enter 4 as the inventory count is very relevant for accurate inventory counts. A human brain can recognize up to 4 numbers almost perfectly and instantly (<60 ms). However, the human brain takes longer (>350 ms) and is less accurate when counting more than 5 numbers. Therefore, at least one count button can be a button to input 4 as the inventory number. Preferably, the maximum number of inventory items that can be assigned to a count button is also 4. Preferably, the inventory count assigned to at least one count button can be 4 as a default, even if the inventory count assigned to the count button can be changed by the user.

The above description is only a preferred example. Even if 4 is not assigned as the inventory number to any of the count buttons, the scanner device 100 described in this disclosure is useful because it saves the user's time. In addition, since user's demand varies, allowing users to freely assign inventory counts to multiple count buttons improves usability. So, an implementation that assigns an inventory count of 5 or more to the count button is also one of the preferred embodiments of this disclosure.

If the scanner device 100 has three count buttons (108, 110, and 112), as discussed in the description of this disclosure, the numbers assigned to the buttons may be 1, 2, and 4, since 1 and 2 are the base numbers for counting, and 4 is the most efficient number in terms of human brain capacity, as discussed above.

If the scanner device 100 has multiple count buttons 106, as discussed in the description of this disclosure, each count button and scanner button 104 may be pressed simultaneously to execute various commands. Examples of commands include turning the flashlight on and off (to be described later) and closing an area (to be described later). In addition, when the scanner device 100 is used in connection with an application installed in the terminal device, the YES command and NO command sent to the application are also included in the examples of commands.

If the scanner device 100 has multiple count buttons 106, as discussed in the description of this disclosure, the inventory count assigned to each count button may be in ascending or descending order as it approaches the user's wrist. In this way, it is easier for the user to intuitively understand which inventory count is assigned to which count button. In a more preferred example, as discussed in the description of this disclosure, the number of inventory count assigned to each count button are in ascending order as they approach the user's wrist. The location of the count button where the user's finger naturally comes in contact with it when the user's finger is extended is the furthest away from the user. Since smaller number of inventory count (e.g., 1) are used more frequently than larger ones, it is desirable that smaller inventory count be assigned to buttons that users press in their natural state.

As one preferred example, the shape of the count buttons 106 can be different from the scan button 104. This is because the user can intuitively distinguish between two buttons with different functions.

Various configurations may be made to the count buttons 106 so that the user can intuitively distinguish between count buttons with different functions. As one preferred example, each of the count buttons 106 may have a different color. As one preferred example, each of the count buttons 106 can have a different tactile feel. As one preferred example, at least two of the respective count buttons of the count buttons 106 can be positioned at different heights (up-down direction in FIG. 1A.)

The speaker 114 plays sound in response to user actions or the state of the scanner device 100. Speaker 114 may play different sounds depending on which count button is pressed when one of the count buttons 106 is pressed. The speaker 114 may announce the number of the inventory count or total inventory count when the count button is pressed.

Figure 1B:
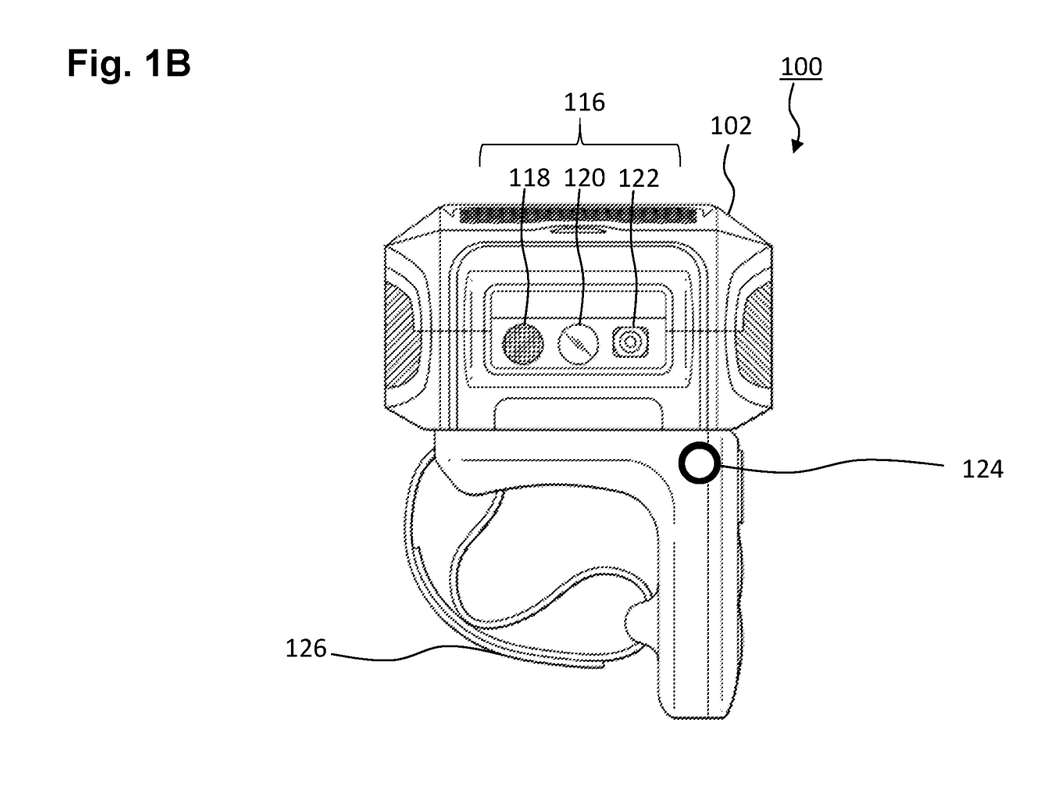

FIG. 1B is a front view of scanner device 100. The optical scanner 116 is an optical unit that scans the code of a product. The optical scanner 116 has a fill light 118 for adjusting the image quality of the code. The optical scanner 116 also has an aim light 120 to illuminate to the user the direction in which the optical scanner 116 is pointing. The optical scanner 116 further has a camera 122 for capturing codes. The optical scanner 116 further has a flashlight 124. The flashlight 124 illuminates the surroundings when the user is scanning in the dark. The user can turn on the flashlight 124 by pressing and holding the scan button 104.

Figure 1C:
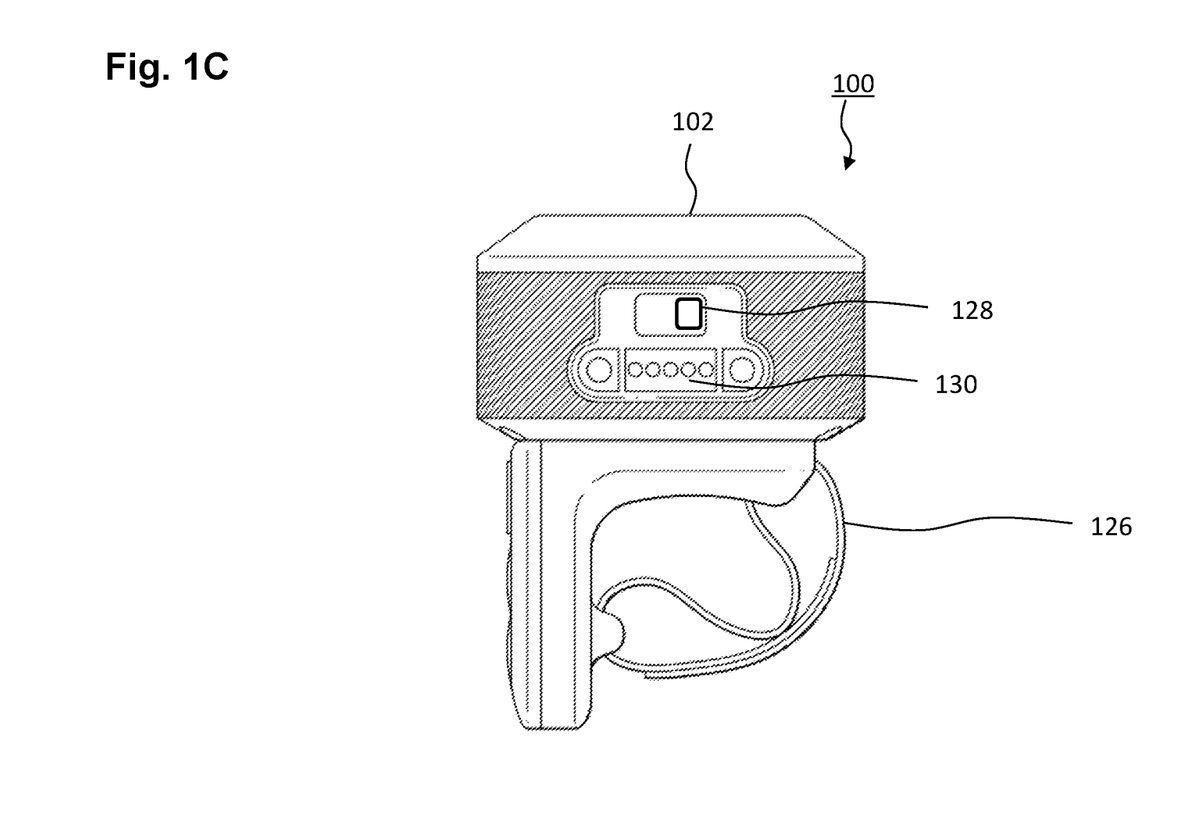

FIG. 1C is a rear view of the scanner device 100. The sliding lock 128 is a slider knob operated to remove a battery of the scanner device 100. The charging connector 130 is a terminal for charging the battery of the scanner device 100.

Figure 1D:
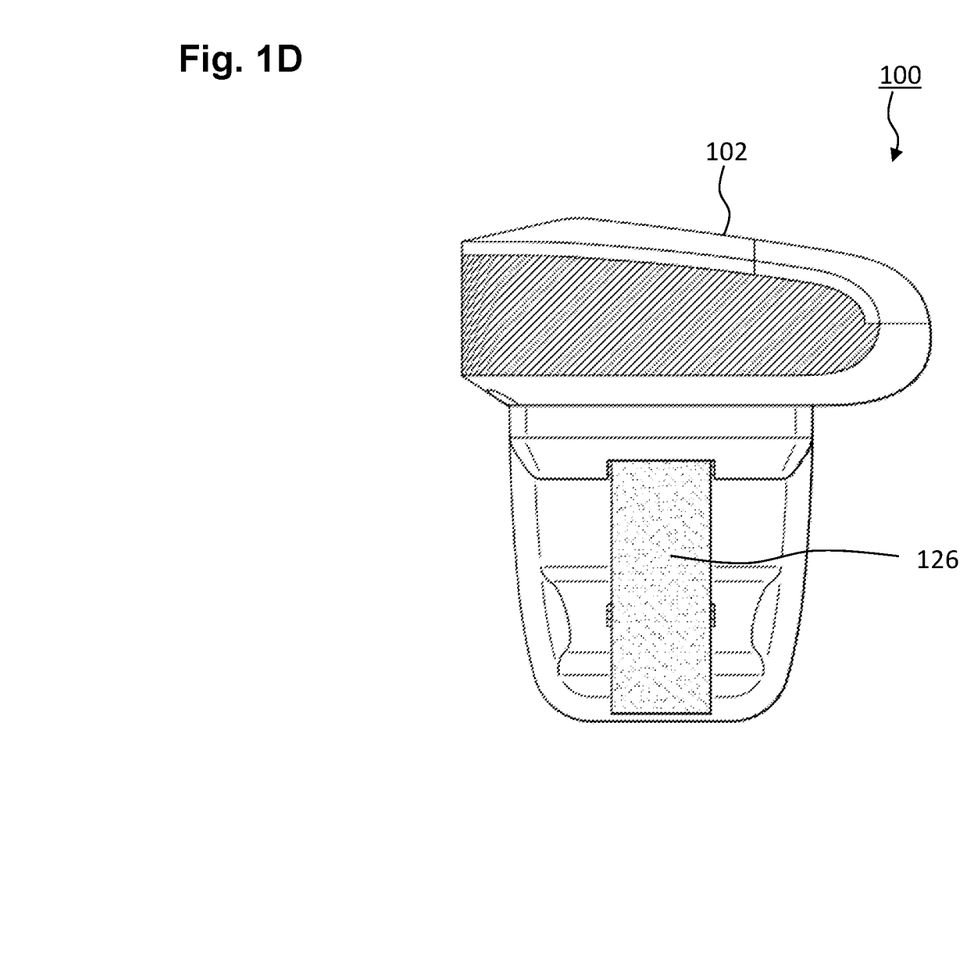
Figure 1E:
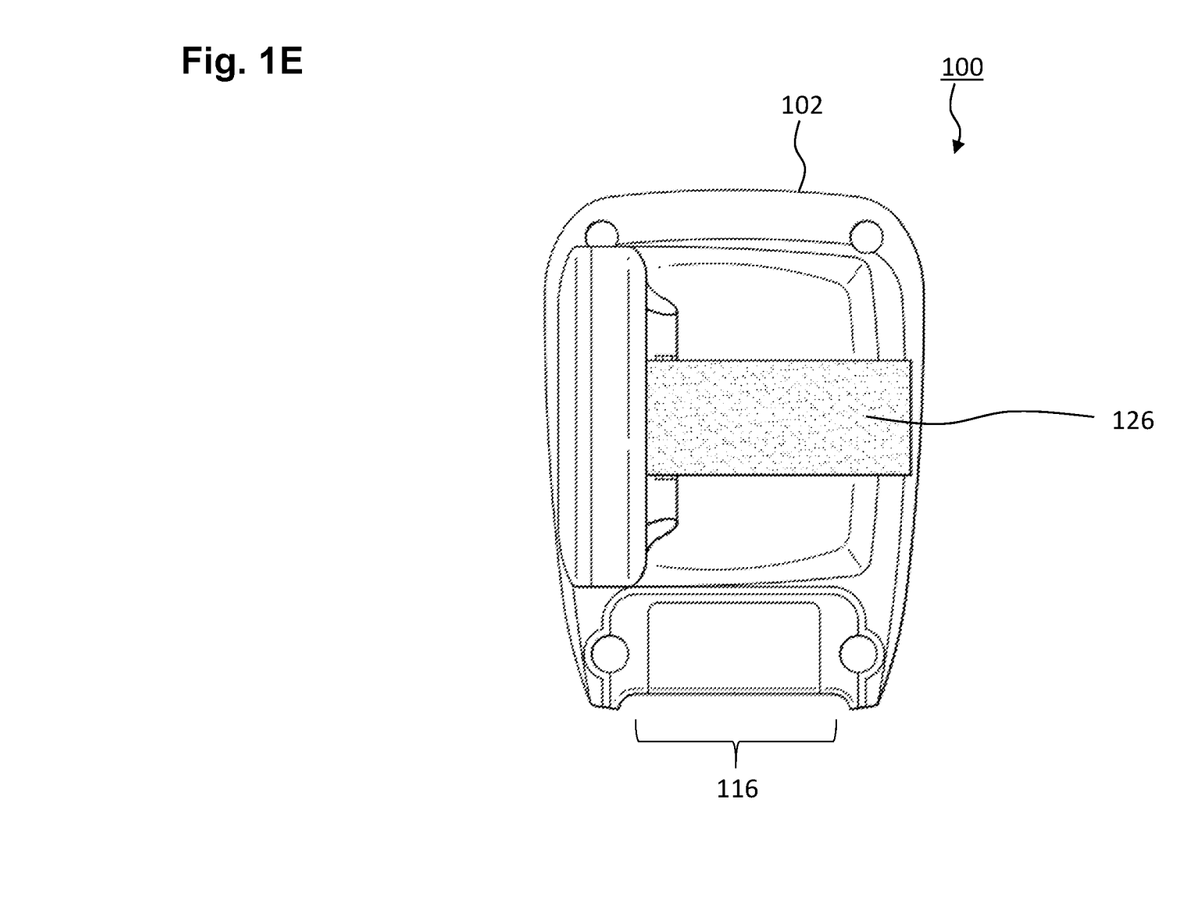

FIG. 1D is a right side view of scanner device 100. FIG. 1E is a bottom view of the scanner device 100. As shown in FIG. 1C through FIG. 1E, the belt loop 126 is used to secure the user's fingers to the scanner device 100. The belt loop 126 may be configured to loop around the user's index finger or the user's index and middle finger to grip the scanner device 100. By wrapping around the fingers, the belt loop 126 allows the user to maintain use of the user's hands while continuing to hold scanner 100.

Figure 1F:
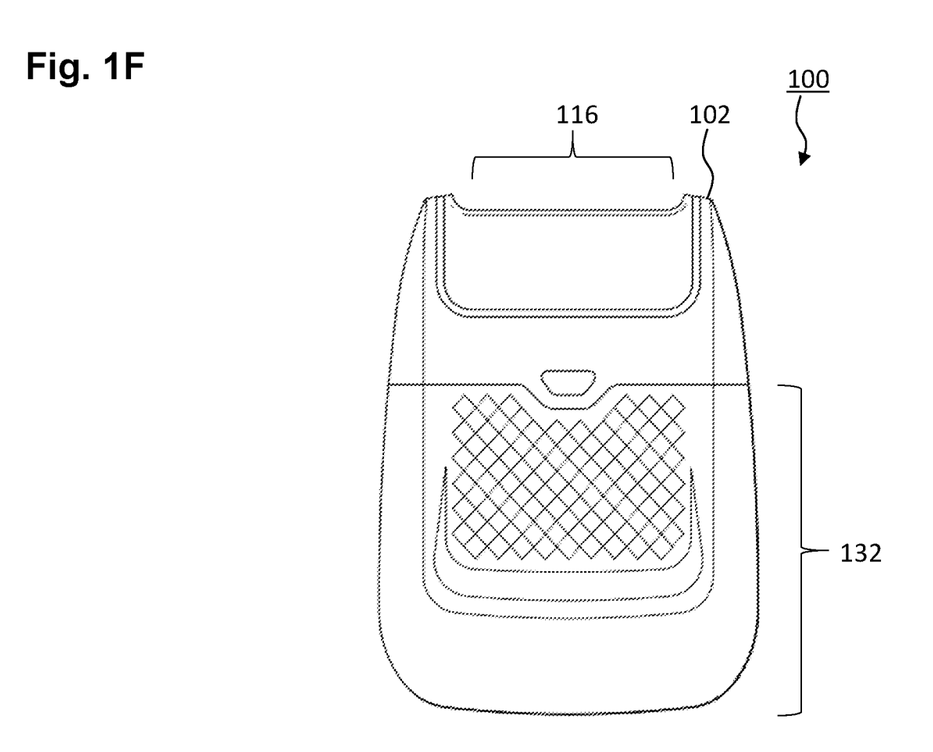

FIG. 1F is a top view of scanner device 100. The battery lid 132 is the lid of the battery case of the scanner device 100.

Figure 2:
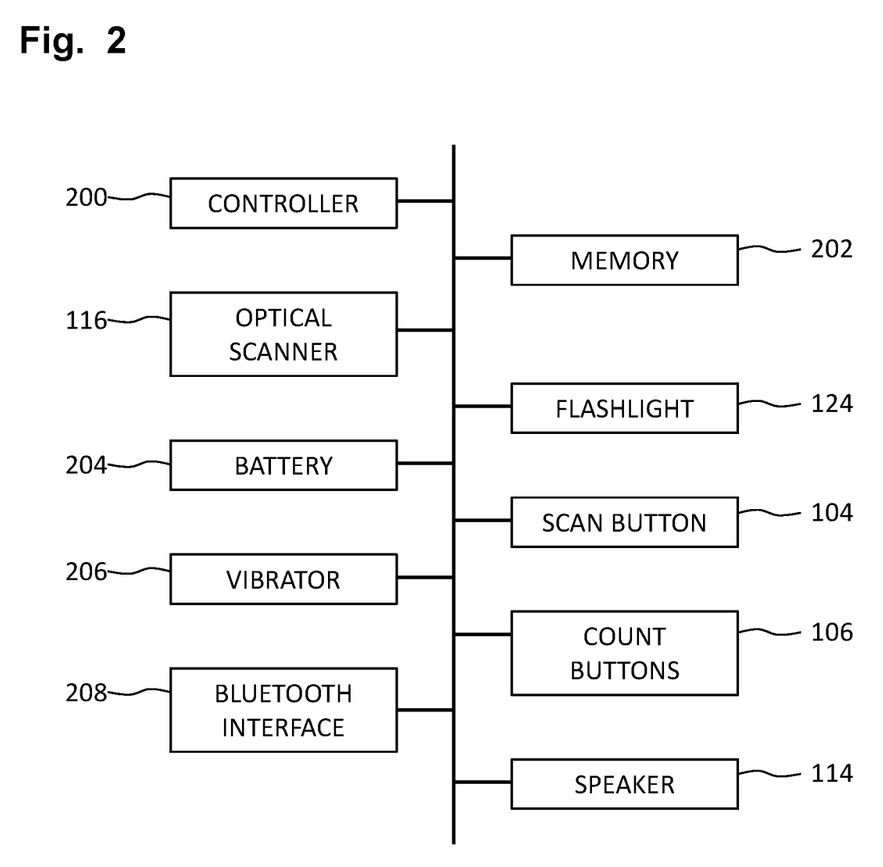
FIG. 2 is an architecture diagram illustrating the ring scanner according to the embodiment.

FIG. 2 is an architecture diagram illustrating the ring scanner. As shown in FIG. 2, the electronic components comprising the scanner device 100 are communicatively and electrically connected by a bus.

The controller 200 controls the electronic components that make up the scanner device 100. Unless otherwise mentioned in this disclosure, the controller 200 operates the scanner device 100 by controlling each component.

The memory 202 is a storage medium that temporarily or permanently stores information necessary for the operation of the scanner device 100. The information necessary for the operation of the scanning device 100 includes user preferences to configure operation of controller 200 (and hence scanner device 100) and the count buttons 106.

The battery 204 provides power to the components of the scanner device 100. The battery 204 of the scanner device 100 is removable.

The vibrator 206 vibrates in response to a user operation or the state of the scanner device 100. The vibrator 206 may vibrate in different patterns when the count buttons 106 is pressed, depending on which count button is pressed. In this disclosure, speaker 114 and vibrator 206 are examples of feedback devices. The feedback device may give different feedback to the user depending on which count button is pressed.

The Bluetooth interface 208 communicatively connects the scanner device 100 to the terminal device. The scanner device 100 may have other preferred or wireless interfaces for connecting to the terminal device. The scanner device 100 may have other wired or wireless interfaces for connecting to the terminal device.

System Architecture

Figure 3:
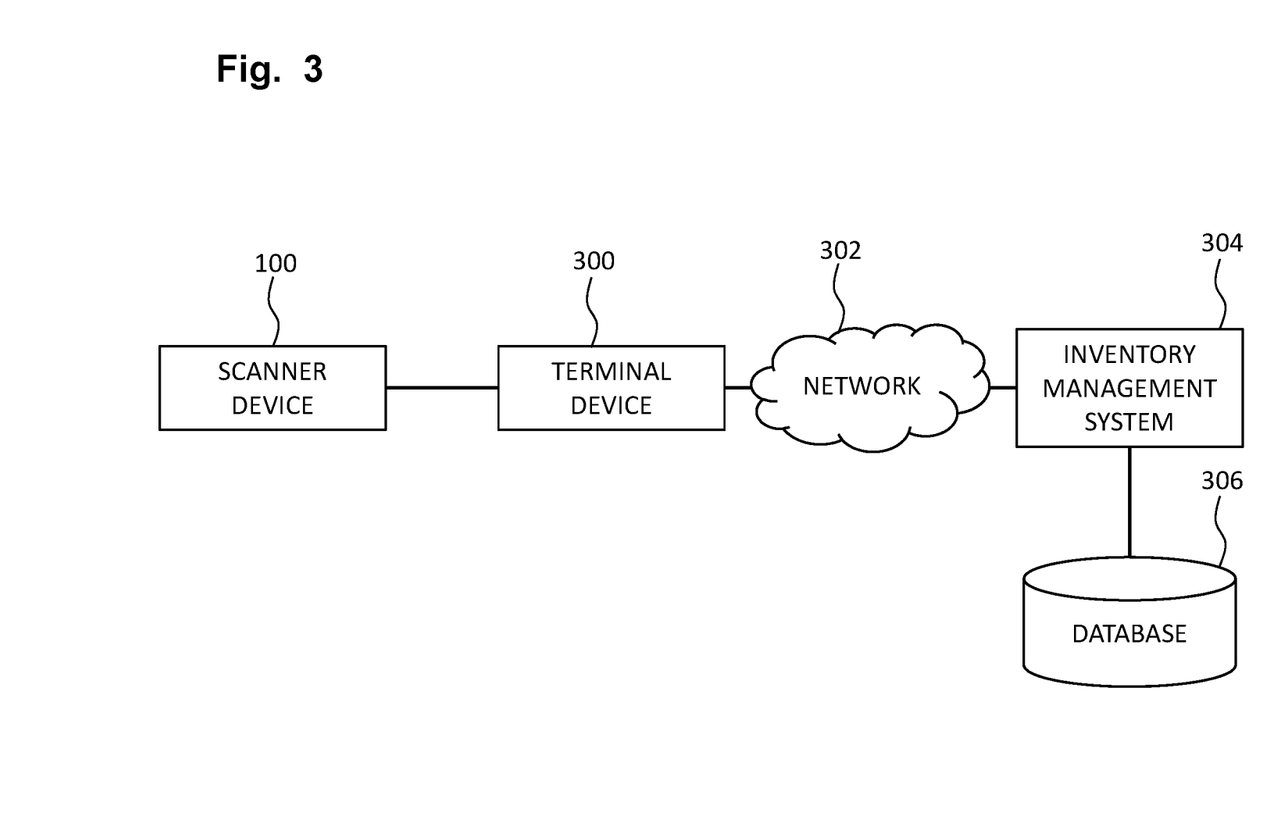
FIG. 3 is a diagram illustrating a system architecture according to the embodiment.

FIG. 3 is a diagram illustrating a system architecture according to the embodiment.

The scanner device 100 communicates with a terminal device. An example of terminal device 300 is a portable terminal with an operating system such as Android. The user uses the terminal device by, for example, fixing it to his/her arm. Wired or wireless communication paths other than Bluetooth may be used for communication between the scanner device 100 and the terminal device 300.

Terminal device 300 may represent a general purpose computing device. The terminal device 300 has a processor, memory, and a touch panel display. Terminal device 300 also has a communication interface for communicating with external devices via network 302.

An application is installed on the terminal device 300. The user references information on the terminal device 300 and enters information into the terminal device 300 by using the application.

The communication between the scanner device 100 and the terminal device 300 includes a variety of content. For example, the scanner device 100 sends the scanned code and symbology (the imaged code actually printed on the items) to the terminal device 30 0 to the terminal device. The communication details that take place when a user performs a scan are described later.

Communications between the scanner device 100 and the terminal device 300 include communications that take place other than when the user is scanning. An example of this communication is the communication that takes place when the scanner device 100 is configured using the terminal device 300. When configuring the settings of the scanner device 100, the user uses the configuration mode of the application installed on the terminal device 300.

Users can use the application to configure various settings. Examples of settings include setting parameters such as the value of the inventory count to be assigned to the count buttons 106, a time interval setting between scans, a decoding time setting, timing of data uploading (manual or automatic), a type of code ID character setting (symbol code ID, aim code ID, or code ID is off), and a picklist mode setting (enable or disable). Examples of settings further include settings related to the operation of the scanner device 100, such as turning on/off the vibrator 206, sleep settings, a volume or tone of the speaker 114, a setting of scanner function (on or off), a setting of illumination brightness, a setting of illumination function (on or off), and a setting of a connection between the terminal device 300 and the scanner device (Bluetooth SPP, Bluetooth BLE, USB SPP, USB HID, or Bluetooth HID), etc.

The terminal device 300 and inventory management system 304 are communicatively connected via network 302. An example of an inventory management system 304 is an application server with inventory management software installed. The inventory management system 304 uses information obtained from the terminal device 300 to update the database 306 using information obtained from terminal device 300.

The application of the terminal unit 300 assists the user in inventory by performing various processes in addition to those described above. An example of their processing can be listed as follows:

The application provides an instruction code to connect the scanner device 100 with the terminal device 300. The user scans the instruction code by using the scanner device 100 to connect the scanner device 100 with the terminal device 300.

The application can show the scanner devices with asset tags that exist nearby the terminal device 300.

The application can connect the scanner device 106 which has a right asset tag without any password.

The application send the instructions to the scanner device 106 to configure an initial setup.

The application can configure the scanner device 106 by using a QR code. When the user scans the QR code shown in the application, a MAC ID address of the scanner device 106 is transmitted to the application. After the configuration, the scanner device 106 restarts and is automatically connected with the terminal device 300 and the application.

The applications can be customized using an SDK.

Operation of the Scanner Device and Terminal Device

Figure 4:
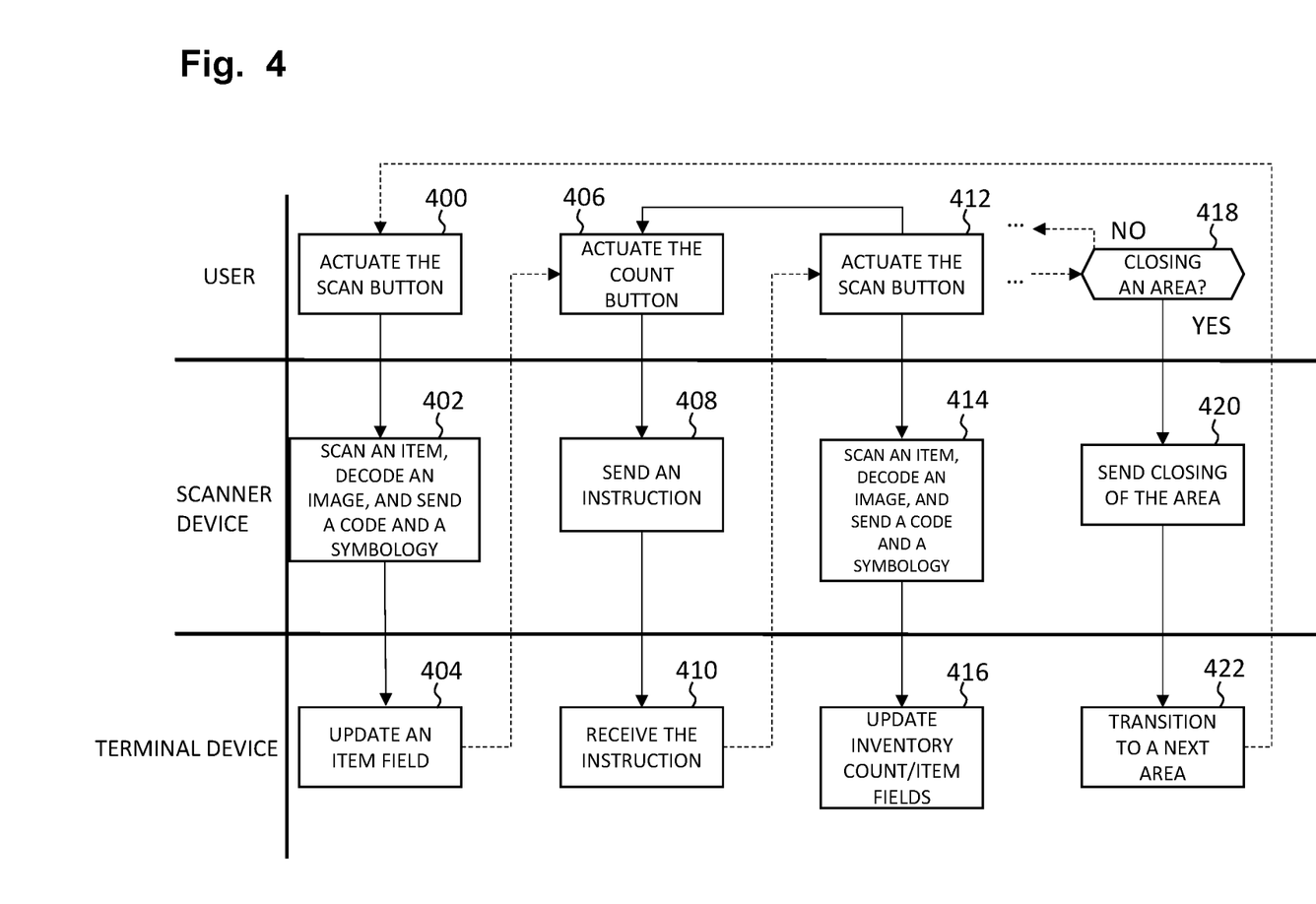
FIG. 4 is a flowchart illustrating an operation of a user, the scanner device, and a terminal device according to the embodiment.

FIG. 4 is a flowchart illustrating an operation of a user, the scanner device, and a terminal device according to the embodiment.

The operation described below is an operation in which a user in a warehouse sends the number of items present in the warehouse to the inventory management device 304 using the scanner device 100 and the terminal device 300 to the inventory management device 304. Before executing the operations described below, the user runs the application on terminal device 300. The user transitions the application from a configuration mode to a counting mode before starting the following operations. Unless otherwise noted, the operations described below are accomplished primarily by the user, the controller 200 of the scanner device 106, and the processor or the application of the terminal device 300.

In operation 400, the user actuates the scan button 104 with the thumb. The user uses the aim light 120 to point the optical scanner 116 at the code of the items and then actuates the scan button 104.

In operation 402, scanner device 100 drives optical scanner 116 to cause the optical scanner to scan the code. The controller 200 of the scanner device 100 causes the optical scanner 116 to scan with the camera 122 in response to the scan button 104 being pressed.

In addition, operation 402 decodes the codes scanned by the scanner device 100. The image scanned in operation 402 should contain an image of the code. The processor 200 of the scanner device 100 extracts the image of the code (symbology) from the scanned image and decodes the symbology to extract a code consisting of a string of characters. In operation 402, the scanner device 100 sends a code consisting of the extracted symbology and string to the terminal device 300.

In addition, in operation 402, the speaker 114 or vibrator 206 may provide feedback to the user. The scanner device 100 may change the way it provides feedback depending on the results of what is performed in operation 402. For example, the scanner device 100 may provide unusual feedback to inform the user if a code (symbology) is not present in the scanned image. For example, the scanner device 100 may provide unusual feedback to inform the user if the transmission to the terminal device 300 was not successful.

In operation 404, terminal device 300 updates a barcode field in the application. The application on terminal device 300 has fields for entering information about the scanned item's barcode, information of quantity of the item, and an area of scanning. In operation 404, the barcode field is updated. Terminal device 300 verifies conditions such as whether the product corresponding to the code is registered in database 306 based on the information received in operation 404. Verification of these conditions is done to avoid incorrect data from entering the database 306. During operation 404, terminal device 300 communicates with inventory management system 304 and communicates with it. During operation 404, terminal device 300 may display the results of the verification and information about the items on its own display.

In operation 406, the user actuates the count buttons 106 with his/her thumb. The user actuates the count buttons 106, each with a corresponding inventory count based on the number of items he/she has viewed. The details of this operation have already been described in the description of count buttons 106. Note that if the user actuates the scanner button 104 instead of the count buttons 106 the operation returns to operation 400.

In operation 408, the scanner device 100 sends instructions to the terminal device 300 containing the inventory count corresponding to the pressed count buttons 106.

In operation 410, terminal device 300 receives an instruction containing the inventory count sent from scanner device 100. If the user performs operation 410 again before proceeding to operation 412, terminal device 300 receives a new inventory count and adds the newly received inventory count to the previously received inventory count. The terminal device 300 enters the received inventory count into the quantity field of the application.

In operation 412, the user, who had previously pressed the count buttons 106, actuates the scan button 104 to scan a new item.

In operation 414, the scanner device 100 performs the same process as in operation 402 and perform the same process.

In operation 416, terminal device 300 saves the application's quantity field of the previously scanned item. In addition, in operation 416, terminal device 300 updates the application's quantity field of newly scanned item in the same manner as in operation 406.

These operations are repeated until the user has scanned the items present in a predetermined area of the warehouse.

In operation 418, the user may close the area when the user determines that the user scanned all the items in the predetermined area. The user can manipulate the scanner device 100 to close the area. An example of the manipulation includes the user simultaneously pressing the scan button 104 and one of the count buttons 106.

In operation 420, scanner device 100 transmits to terminal device 300 that the user has closed the area.

In operation 422, the terminal device 300 indicates on the display that it is closing the current area and transitioning to the next area and updates the area field of the application. The user may open the closed area by manipulating the application, if necessary.

The described operations are repeated until the user exits the application.

Key Functions of the Scanner Device

The structure and operation of the scanner device 100 have now been described. The following sections describe the functions that can be achieved by operating the scan button 104 and the count button 106 on the scanner device 100 in detail. In the following embodiments, it is assumed that colors are assigned to count buttons 108, 110, and 112, which comprise count buttons 106. In this case, red is assigned to count button 108, yellow to count button 110, and green to count button 112.

The first embodiment is that the function of the scan button 104 depends on which field is the focus of the terminal device 300's application. If the user shortly presses or holds down the scan button 104 when the field in focus is the area field, the scanner device 100 can scan the area. If the user shortly presses or holds down the scan button 104 when the field in focus is the barcode field, the scanner device 100 can scan the code. If the user shortly presses or holds down the scan button 104 when the field in focus is the quantity field, the scanner device 100 may enter the quantity of the item and move the focus to the barcode field. If the user shortly presses or holds down the scan button 104 when the field in focus is the quantity field, the scanner device 100 may scan the code of the next item. The table below summarizes the operations described above.

| Keys Used | Short/long | When on Field | Function |
|---|---|---|---|
| Trigger (Scan button 104) | Short/long | Area | Scanning area |
| | Short/long | Barcode | Scanning barcode |
| | Short/long | Quantity | Enter/pcs and move barcode field |
| | Short/long | Quantity | Scanning next barcode |

The second embodiment is that when the scan button 104 and one of the count buttons 106 (e.g., count button 112) are pressed shortly at the same time, an inventory count value is set on one of the count buttons 106. The table below summarizes the operations described above. In this example, only count button 112 is configurable, but it is possible to set values for count buttons 108 and 110.

| Keys Used | Short/long | When on Field | Function |
|---|---|---|---|
| Trigger + Red (Count button 108) | Short | Area only | Free |
| Trigger + Yellow (Count button 110) | Short | Area only | Free |
| Trigger + Green (Count button 112) | Short | Area only | Set value to green button |

The third embodiment is that the function executed when one of the count buttons 106 is pressed shortly is to input the value regarding the quantity of the item, as described above. At this time, the terminal device 300's application focuses on the quantity field. The behavior of a short press of one of the count buttons 106 when the focus is not on the quantity field may be user-configurable or may not perform any operation. The table below summarizes the operations described above. The count buttons 108, 110, and 112 are assigned the inventory counts 1, 2, and 3, respectively. The inventory counts for count button 112 is configurable.

| Keys Used | Short/long | When on Field | Function |
|---|---|---|---|
| Red | Short | Area | n/a |
|  | Short | Barcode | n/a |
|  | Short | Quantity | Value- 1 |
| Yellow | Short | Area | n/a |
|  | Short | Barcode | n/a |
|  | Short | Quantity | Value- 2 |
| Green | Short | Area | n/a |
|  | Short | Barcode | n/a |
|  | Short | Quantity | Value- 3 Default/Configured |

The fourth embodiment is that when one of the count buttons 106 (e.g., count button 108) is pressed and held, the value of the field where the application is focusing on may be deleted. Another example of the fourth embodiment is that when one of the count buttons 106 (e.g., count button 110) is pressed and held, the area or the code where the application is focusing is validated, and if the application is focusing on the quantity field, it indicates moving to the next area. Another example of the fourth embodiment is that when one of the count buttons 106 (e.g., count button 112) is pressed and held, the flashlight 124 is turned on as a torchlight. The table below summarizes the operations described above.

| Keys Used | Short/long | When on Field | Function |
|---|---|---|---|
| Red | Long | Area | Erase area |
|  | Long | Barcode | Erase barcode |
|  | Long | Quantity | Erase quantity |
| Yellow | Long | Area | Torch |
|  | Long | Barcode | Torch |
|  | Long | Quantity | Torch |
| Green | Long | Area | Validate area in case area not in range |
|  | Long | Barcode | Validate barcode in case not in PMF |
|  | Long | Quantity | Moving to new area |

The fifth embodiment is that when two or more of the count buttons 106 are pressed shortly at the same time, the inventory counts assigned to each buttons may be added up and set the added value as the inventory count. For example, when the count button 108 (assigned value is 1) and the count button 110 (assigned value is 2) are pressed shortly together, the value of 3 may be sent as the inventory count. Another example of the fifth embodiment is that when two or more of the count buttons 106 are pressed shortly at the same time, the value of the inventory count assigned to none of the count buttons 106 is sent as the inventory count. For example, when the count button 110 (assigned value is 2) and the count button 112 (assigned value is 3) are pressed shortly together, the value of 6 may be sent as the inventory count. This value may also be configurable. The table below summarizes the operations described above.

| Keys Used | Short/long | When on Field | Function |
|---|---|---|---|
| R + Y | Short | Area | n/a |
|  | Short | Barcode | n/a |
|  | Short | Quantity | Value - 3 |
| G + Y | Short | Area | n/a |
|  | Short | Barcode | n/a |
|  | Short | Quantity | value -6 even when configured |

The sixth embodiment is that when two or more of the count buttons 106 are pressed and held at the same time, any of the functions/operations described above or new functions may be performed. The table below summarizes the operations described above.

| Keys Used | Short/long | When on Field | Function |
|---|---|---|---|
| R + Y | Long | Area | Free |
|  | Long | Barcode | Free |
|  | Long | Quantity | Free |
| G + Y | Long | Area | Free |
|  | Long | Barcode | Free |
|  | Long | Quantity | Free |

The feedback device (e.g., speaker 114 or vibrator 206) may provide different feedback to the user depending on whether the button is pressed long or short. For example, if the button is pressed and held for a long time, it may sound two beeps or vibrate two times, and if the button is pressed for a short time, it may sound one beep or vibrate one time to provide feedback to the user. The feedback device may also beep at different frequencies depending on the button or combination of buttons pressed. The table below summarizes the operations described above.

| Keys Used | Short/long | when on Field | Sound/beeps |
|---|---|---|---|
| Trigger | Short/long | Area | 2950 HZ |
|  | Short/long | Barcode | 2950 HZ |
|  | Short/long | Quantity | no |
|  | Short/long | Quantity | 2950 HZ |
| Trigger + Red | Short | Area only | n/a |
| Trigger + Yellow | Short | Area only | n/a |
| Trigger + Green | Short | Area only | n/a |
| Red | Short | Area | 2880 HZ |
|  | Short | Barcode | 2880 HZ |
|  | Short | Quantity | 2880 HZ |
| Green | Short | Area | 2670 HZ |
|  | Short | Barcode | 2670 HZ |
|  | Short | Quantity | 2670 HZ |
| Yellow | Short | Area | 2810 HZ |
|  | Short | Barcode | 2810 HZ |
|  | Short | Quantity | 2810 HZ |
| Red | Long | Area | TWO BEEPS |
|  | Long | Barcode | TWO BEEPS |
|  | Long | Quantity | TWO BEEPS |
| Green | Long | Area | TWO BEEPS |
|  | Long | Barcode | TWO BEEPS |
|  | Long | Quantity | TWO BEEPS |
| Yellow | Long | Area | TWO BEEPS |
|  | Long | Barcode | TWO BEEPS |
|  | Long | Quantity | TWO BEEPS |
| R + Y | Short | Area | 2740 HZ |
|  | Short | Barcode | 2740 HZ |
|  | Short | Quantity | 2740 HZ |
| G + Y | Short | Area | 2600 HZ |
|  | Short | Barcode | 2600 HZ |
|  | Short | Quantity | 2600 HZ |

-continued

| Keys Used | Short/long | when on Field | Sound/beeps |
|---|---|---|---|
| R + Y | Long | Area | TWO BEEPS |
|  | Long | Barcode | TWO BEEPS |
|  | Long | Quantity | TWO BEEPS |
| G + Y | Long | Area | TWO BEEPS |
|  | Long | Barcode | TWO BEEPS |
|  | Long | Quantity | TWO BEEPS |

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and, thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A scanner device, comprising:
   a housing configured to be affixed to an index finger of a hand of a user;
   a plurality of count buttons located on the housing and configured to be actuated by a thumb of the hand of the user when the housing is affixed to the index finger of the hand of the user, wherein each of the plurality of count buttons is associated with a predetermined number;
   an optical scanner located in the housing; and
   a controller configured to:
   (i) cause the optical scanner to scan a code of an item,
   (ii) when the thumb of the hand of the user actuates a respective one of the plurality of the count buttons, send an instruction indicating that the item has a count of the predetermined number associated with the respective one of the plurality of count buttons, and
   (iii) when the user actuates two or more of the plurality of count buttons simultaneously, send an instruction indicating that the item has a count equaling a sum of the predetermined numbers associated with the two or more of the plurality of count buttons actuated simultaneously, wherein the controller is configured to store a count value in an inventory database based on the count of the predetermined number and the count equaling the sum.

2. The scanner device of claim 1, wherein the predetermined number associated with one of the plurality of count buttons located closer to the thumb of the hand of the user is greater than the predetermined number associated with another one of the plurality of count buttons located farther from the thumb of the hand of the user.

3. The scanner device of claim 1, wherein the predetermined number associated with at least one of the plurality of count buttons is set to 4 as default.

4. The scanner device of claim 1, wherein:
   a first predetermined number associated with at least one of the plurality of count buttons is set to 1 as default;
   a second predetermined number associated with at least another one of the plurality of count buttons is set to 2 as default; and
   a third predetermined number associated with at least another one of the plurality of count buttons is set to 4 as default.

5. The scanner device of claim 1, further comprising:
   a feedback device located in the housing;
   wherein the scanner device is further configured to cause the feedback device to cause different feedback to the user corresponding to each count button when the thumb of the hand of the user actuates at least one of the plurality of count buttons.

6. The scanner device of claim 1, wherein the count of the item is fixed as the predetermined number in response to the actuation of the respective one of the plurality of count buttons.

7. The scanner device of claim 1, wherein the count value is increased in response to the actuation of the respective count button.

8. The scanner device of claim 1, wherein each of the plurality of count buttons includes an independent button cap.

9. A method of scanning an item by using a scanner device, including a housing configured to be affixed to an index finger of a hand of a user, an optical scanner, and a plurality of count buttons, located on the housing and configured to be actuated by a thumb of the hand of the user when the housing is affixed to the index finger of the hand of the user, wherein each of the plurality of count buttons is associated with a predetermined number, the method comprising:
   (i) causing the optical scanner to scan a code of the item;
   (ii) when the thumb of the hand of the user actuates a respective one of the plurality of count buttons, sending an instruction indicating that the item has a count of the predetermined number associated with the respective one of the plurality of count buttons, and (iii) when the user actuates two or more of the plurality of count buttons simultaneously, sending an instruction indicating that the item has a count equaling a sum of the predetermined numbers associated with the two or more of the plurality of count buttons actuated simultaneously, wherein a controller is configured to store a count value in an inventory database based on the count of the predetermined number and the count equaling the sum.

10. The method of claim 9, wherein the predetermined number associated with one of the plurality of count buttons located closer to the thumb of the hand of the user is greater than the predetermined number associated with another one of the plurality of count buttons located farther from the thumb of the hand of the user.

11. The method of claim 9, wherein the predetermined number associated with at least one of the plurality of count buttons is set to 4 as default.

12. The method of claim 9, wherein:
a first predetermined number associated with at least one of the plurality of count buttons is set to 1 as default;
a second predetermined number associated with at least another one of the plurality of count buttons is set to 2 as default; and
a third predetermined number associated with at least another one of the plurality of count buttons is set to 4 as default.

13. The method of claim 9, wherein:
a feedback device is located in the housing; and
the method further comprises causing the feedback device to cause different feedbacks to the user corresponding to each count button when the thumb of the hand of the user actuates at least one of the plurality of count buttons.

14. The method of claim 9, wherein the indicating that the item has the count of the predetermined number comprises fixing the count of the item as the predetermined number in response to the actuation of the respective one of the plurality of count buttons.

15. The method of claim 9, wherein the count value is increased in response to the actuation of the respective count button.

16. The method of claim 9, wherein each of the plurality of count buttons includes an independent button cap.

17. A scanner device, comprising:
a housing configured to be affixed to an index finger of a hand of a user;
a plurality of count buttons located on the housing and configured to be actuated by a thumb of the hand of the user when the housing is affixed to the index finger of the hand of the user, wherein each of the plurality of count buttons is associated with a predetermined number;
an optical scanner located in the housing; and
a controller configured to:
(i) cause the optical scanner to scan a code of an item,
(ii) when the thumb of the hand of the user actuates a respective one of the plurality of count buttons, send an instruction indicating that the item has a count of the predetermined number associated with the respective one of the plurality of count buttons, and
(iii) when the user actuates two or more of the plurality of count buttons simultaneously, send an instruction indicating that the item has a count of a configured number associated with a combination of the two or more of the plurality of count buttons actuated simultaneously, wherein the controller is configured to store a count value in an inventory database based on the count of the configured number.

18. The scanner device of claim 17, wherein the count of the item is set as the predetermined number in response to the actuation of the respective one of the plurality of count buttons.

19. The scanner device of claim 17, wherein the count value is increased in response to the actuation of the respective count button.

20. The scanner device of claim 17, wherein each of the plurality of count buttons includes an independent button cap.

* * * * *